United States Patent [19]

Mensing

[11] Patent Number: 4,532,708
[45] Date of Patent: Aug. 6, 1985

[54] ROTARY LAWN MOWER BLADE

[76] Inventor: Harold F. Mensing, 6394 Peninsula Rd., Erie, Mich. 48133

[21] Appl. No.: 598,667

[22] Filed: Apr. 10, 1984

[51] Int. Cl.³ .............................................. A01D 55/18
[52] U.S. Cl. ........................................ 30/347; 30/350; 30/357; 56/295
[58] Field of Search ................. 30/347, 350, 353, 351, 30/240, 355, 357; 56/295, 12.7; 51/206 R

[56] References Cited
U.S. PATENT DOCUMENTS 2,337,141 12/1943 Withington ............................ 30/357
2,869,311 1/1959 Beeston ............................. 30/350 X
3,049,843 8/1962 Christensen ....................... 51/206 R
3,553,905 1/1971 Lemelson ........................... 51/206 R Primary Examiner—Jimmy C. Peters

[57] ABSTRACT

A rotary lawn mower blade made of a plurality of relatively small cutter segments of greater hardness arranged in series end to end along the leading edges of both ends of an elongated metal cutter bar of lesser hardness. The cutter segments are fusibly bonded to the cutter bar and the adjoining ends of the cutter segments of each series are bonded together.

24 Claims, 8 Drawing Figures

ROTARY LAWN MOWER BLADE

BACKGROUND OF THE INVENTION

1. Field of Invention

Generally speaking this invention relates to an improved rotary lawn mower blade having cutting edges which will retain their sharpness longer than those of blades commonly in use at this time. More specifically it relates to a rotary lawn mower blade comprised of a horizontally rotatable metal cutter bar of lesser hardness having a plurality of relatively small cutter segments of greater hardness fusibly bonded along the leading edges of each end of the cutter bar.

2. Description of Prior Art

Numerous attempts have been made to provide a rotary lawn mower blade that has cutting edges which resist abrasion from sand and dirt particles normally encountered during mowing operations. Nonetheless the most commonly used blade of today does not have cutting surfaces that are especially wear resistant. State of the art blades are one piece steel blades which must be sharpened repeatedly during a mowing season or used dull. One difficulty with using hardened cutter elements is that those having sufficient hardness to resist abrasive wear are relatively brittle and thus subject to being broken or nicked as a result of an accidental impact with a stone or other hard object on a lawn. The problem is made even more complicated by the fact that the cutting surfaces are long and narrow. One solution proposed by the prior art to overcome the problem of brittleness was a composite blade constructed with a hardened layer of material sandwiched between two outer layers of more malleable material. Apparently it was too costly to produce or failed to work according to expectations.

SUMMARY OF THE INVENTION

The lawn mower blade of this invention is a knifelike blade comprising an elongated steel cutter bar designed for horizontal rotation about a vertical central axis. A series of cutter segments made of a material, such as tungsten carbide, having a substantially greater hardness than that of the steel cutter bar is bonded along the leading edge of each end of the cutter bar. The cutter segments of each series are arranged in an end to end pattern with a minimum distance between the adjoining ends. Each cutter segment has a frontal cutting face extending upwardly and rearwardly from its cutting edge. Preferably all of the cutter segments are elongated segments with their longitudinal dimensions extending in the direction of their cutting edges. The lateral width and heigth dimensions of a segment are each about one-half of its length. The individual cutter segments are large enough to be mechanically handled individually yet small enough to not cause a significant unbalance of the blade in the event one of the cutter segments is dislodged by an accidental destructive impact with a foreign object, such as a stone, during operation. Preferably the cutter segments are positioned so that each of their cutting edges is disposed at a zero or negative rake cutting angle. The leading edges of the cutter bar may be notched or fluted so as to provide a series of mounting pockets for the cutter segments. The above mentioned features cooperate to provide an abrasion resistant lawn mower blade that can be manufactured economically and readily by automated production equipment.

Figure 6:
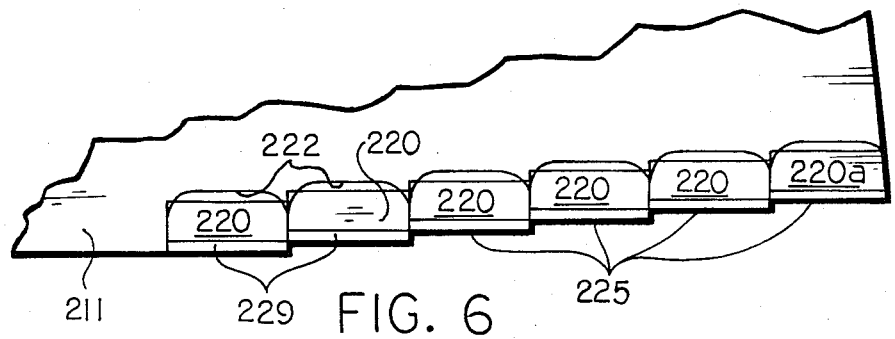
FIG. 6 is a view similar to FIG. 4 but of an embodiment in which the cutter segments are arranged stepwise.

FIG .7 is a right hand end view of FIG. 6.

Figure 8:
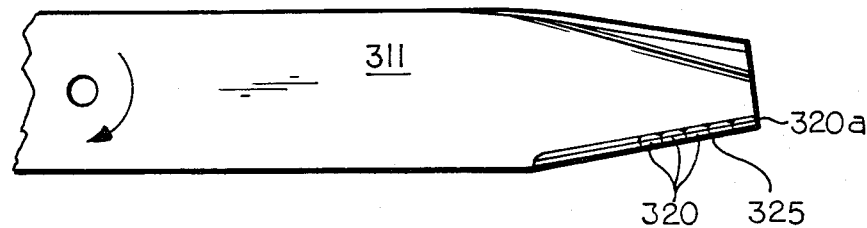

FIG. 8 is a plan view principally of the right half of a mower blade embodiment in which the cutting edge is angled rearwardly towards the following edge of the cutter bar.

DETAILED DESCRIPTION OF THE DRAWINGS

Figure 1:
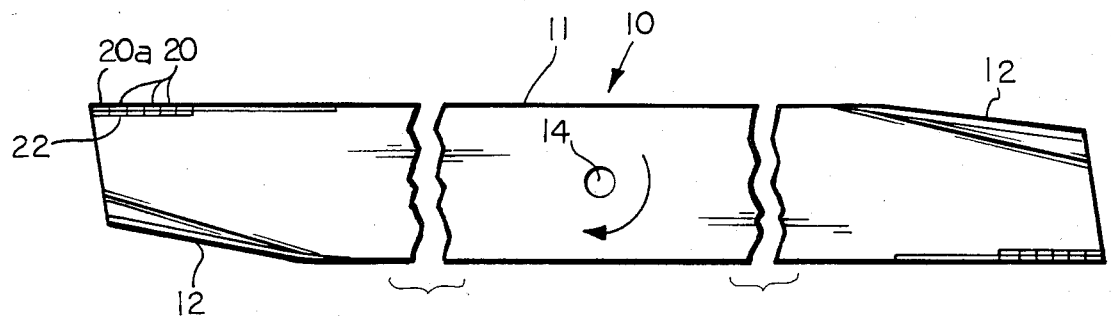
FIG. 1 is a foreshortened plan view of a lawn mower blade of this invention with intermediate portions of the cutter bar broken away on both the left side and right side of its center.
Figure 2:
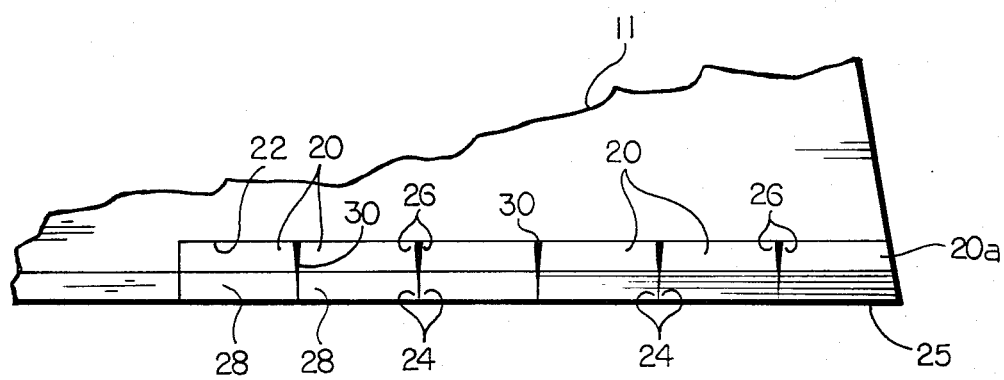
FIG. 2 is an enlarged fragmentary view of the leading edge of the right end of the cutter bar of FIG. 1 showing the cutter segments in greater detail.
Figure 3:
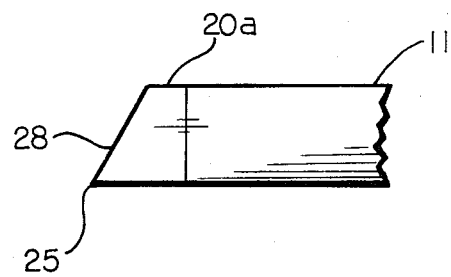
FIG. 3 is a right hand end view of the FIG. 2 fragmentary view.

Referring to the drawings, four embodiments of the rotary lawn mower blade are illustrated. In each embodiment, the rotary blade is comprised of a steel cutter bar adapted to be rotated horizontally in a clockwise direction about an axis extending through the center in a direction perpendicular to its midsection which is flat. A plurality of cutter segments made of tungsten carbide or any other suitable substance having a hardness substantially greater than the steel bar are bonded to the leading edges of the end portions of the cutter bar. The size, shape and arrangement of the cutter segments varies between the various embodiments. The mower blade 10 shown in FIGS. 1-3 had a cutter bar 11 with upturned fins 12 on the rear half of the end portions of the bar to produce a fan effect when the blade is rotated about its central axis 14. A plurality of cutter segments 20 are arranged serially end to end in straight lines along cut outs or recesses 22 in the front or leading edges of the bar opposite from the fins. Although six cutter segments 20 are shown in each series, more or fewer cutter segments could be used. Cutter segments 20 are made of an abrasive resistant hard material, such as tungsten carbide, preferably having a Rockwell A scale hardness of 80 or higher. Preferably all of the cutter segments 20, with the possible exception of cutter segments 20a located at the tips of the cutter bar, are identical in shape and size. The cutter segments 20 when viewed directly from the side adjacent to the bar, namely the back side, have generally rectangular outlines. When viewed from the underside or bottom they also have generally rectangular outlines but the ends are tapered inwardly slightly, for example 3°-5°, from front to back, so that when they are arranged end to end along recesses 22 the front corners 24 of adjacent segments 20 will be in contact with each other so as to form an effectively continuous cutting edge 25 from the beginning to the end of each series of segments 20. The maximum clearance between the adjacent segments 20 will be at their rear corners 26. Recesses 22 extend inwardly an inch or more from the ends of the cutter bar 11 and have a width substantially equal to the front to back width of a cutter segment 20. The front or cutting face 28 of each cutter segment 20 is planar and extends upwardly and rearwardly from the cutting edge 25 at a 60° angle of inclination relative to the bottom surface of the segment (see FIG. 3). The cutting edge is disposed at a non positive rake angle relative to a radial line extending through the center of a cutter segment and the rotational axis of the cutter bar 11. Typically this rake angle is less than $-5°$. Preferably the overall heighth of each cutter segment 20 is substantially equal to the stock thickness of the adjacent portion of cutter bar 11 and also to the overall width of the segment. The length of each cutter segment 20 exceeds each of these lateral dimensions preferably by a ratio of between 2:1 and 3:1. For example the nominal outside dimensions of an individual cutter segment may be $\frac{1}{8}$ inch heighth, $\frac{1}{8}$ inch width and $\frac{1}{4}$ inch length for a cutter bar 11 having a nominal stock thickness of $\frac{1}{8}$ inch. A cutter segment made from a tungsten carbide blank of this size weighs slightly more than 0.02 ounces and preferably comprises less than 0.25% of the total weight of the blade. Typically the weight ratio between the cutter bar and a cutter segment is greater than 600:1.

The adjacent ends of the cutter segments 20 are bonded to each other and the backsides of the segments are bonded to the cutter bar 11 by means of a fusible metal material 30 such as a copper brazing alloy or a silver solder, that is softer or more malleable than the cutter bar. With the exception of cutter segment 20a located at the outer end of each series of cutter elements 20, the entire surface of the ends and back side of each segment 20 is bonded to the surrounding surfaces. In other words each cutter segment 20 is enclosed on three sides and thus more than half and preferably more than 70% of its peripheral surface is attached to an adjoining surface by the bonding material. This mounting structure provides a relatively high ratio of bonded surface area to weight and thereby reduces the likelihood of a cutter segment being dislodged during operation by accidental impact with a foreign object. For example, the ratio of bonded surface area of each series cutter segment 20 measured in square inches to the weight of each of them measured in ounces is at least 2:1. Also in the event a cutter segment is dislodged or fractured by such an impact there is a limited likelihood of the damage extending into an adjoining segment which has not been impacted directly. Another advantage of forming the cutters on the cutter bar 11 from a plurality of small segments, rather than from relatively large single elements, and mounting the small elongated cutter segments as indicated above, is that the probability of a severe unbalanced condition of the blade occurring due to impact damage is reduced.

Figure 4:
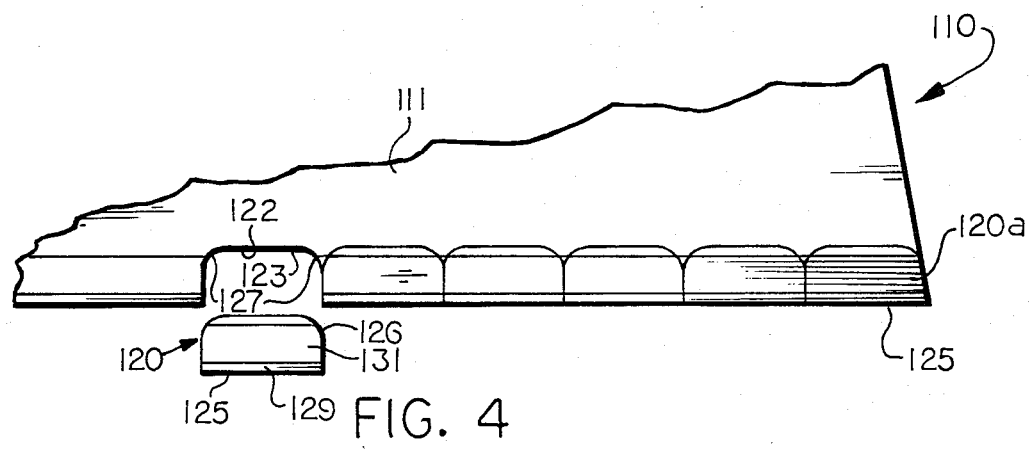
FIG. 4 is a view similar to FIG. 2 but of another embodiment in which the cutter segments have arcuate corners on the side adjacent to the cutter bar and are mounted in correspondingly shaped pockets formed in the leading edge of the bar.
Figure 5:
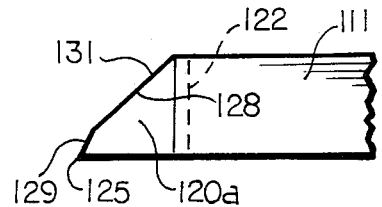
FIG. 5 is a right hand end view of FIG. 4 showing a steeply inclined cutting face portion next to the cutting edge and a less steeply inclined face portion extending to the top of the bar.

The embodiment 110 shown in FIGS. 4 and 5 differs from the previously described embodiment in three ways. The rear corners 126 of cutter segments 120 are radiused and the cutter segment recess of cutter bar 111 is provided with a plurality of undulations or pockets 122 formed in its leading edge to hold the cutter segments 120. To show the pocket 122 more clearly one of the cutter segments 120 in FIG. 4 has been displaced laterally forward from its normal position on the leading edge of the cutter bar. Each pocket 122 has a flat central section 123 and arcuate or radiused ends 127 so as to closely conform to the shape of the rear portion of a cutter segment 120.

The third difference relates to the cutter face 128. The cutting face of this embodiment is comprised of two planar surfaces disposed at an angle relative to each other. The narrower planar surface 129 adjacent to the cutting edge 125 extends upwardly and rearwardly at an angle of 60° relative to the bottom surface of the cutter segment 120. The wider planar surface 131 also extends upwardly and rearwardly but at a lesser angle, for example 45° (see FIG. 5). The area of the wider planar cutting surface 131 is twice the size of the narrower surface 129.

Figure 7:
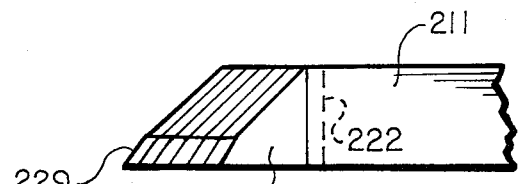

The cutter segments 220 shown in the embodiment of FIGS. 6 and 7 have the same size and shape as cutter segments 120 in FIGS. 4 and 5. The primary difference between these two similar embodiments is that the cutting edges 225 of the segments 220 are offset from one another rather than being disposed in a straight line. They are arranged in a series of steps beginning with an innermost cutter segment 220 which has its cutting edge aligned with the front edge of the cutter bar 211 followed by the adjoining cutter segment 220 which has its cutting edge parallel with the innermost segment 220 but disposed rearwardly a short distance, for example 1/16 inch or directly below the top edge of the narrow planar face section 229. The cutter segment pockets 222 are also offset in the same stepwise fashion.

The FIG. 8 embodiment is also similar to the FIGS. 4 and 5 embodiment in most respects except the cutting edge 325 of cutter segments 320 is angled rearwardly rather than being parallel to the leading edge of the cutter bar 311. Tip segment 320a of this embodiment as well as tip segments 20a, 120a and 220a of the other embodiments are basically the same shape as their respective non tip segments except their outer ends are ground at an angle so as to conform to the relief angle on the end of the cutter bar. Preferably the various tip segments are made of a material having a hardness comparable to the cutter segments in the series but of greater impact resistance.

What is claimed is:

1. A rotary lawn mower cutter blade comprising: an elongated steel cutter bar adapted to rotate about an axis located in its center extending perpendicularly through a flat midsection, a plurality of cutter segments fusibly bonded along a leading edge of each end of said bar, said segments each having a cutting edge and a hardness greater than the hardness of said cutter bar, said segments being arranged in series with the outer end of each segment abutting the adjacent inner end of a succeeding segment in the series at the cutting edge, each of said segments having a cutting face angled upwardly and rearwardly from its cutting edge, said cutting edge being disposed at a non positive rake angle and a cutter tip segment fusibly bonded to said cutter bar adjacent to the outermost cutter segment of each of said series of cutter segments.

2. A rotary lawn mower cutter blade according to claim 1 wherein the abutting ends of said cutter segments in each series are bonded together by a fusible material having a hardness less than that of said cutter segments.

3. A rotary lawn mower cutter blade according to claim 1 wherein each of said series cutter segments has exposed upper and lower surfaces and a bonded surface which extends around more than 50% of its periphery.

4. A rotary lawn mower cutter blade according to claim 1 wherein the ratio of the bonded surface area of each series segment measured in square inches to the weight of each series segment measured in ounces is at least 2:1.

5. A rotary lawn mower cutter blade according to claim 3 wherein said cutter bar is provided with a plurality of pockets each of which surrounds a peripheral portion of one of said series segments.

6. A rotary lawn mower cutter blade according to claim 1 wherein the weight ratio between the cutter bar and a cutter segment is greater than 600:1.

7. A rotary lawn mower cutter blade according to claim 1 wherein said series cutter segments have end walls which converge slightly in a rearwardly direction.

8. A rotary lawn mower cutter blade according to claim 1 wherein said cutter tip segment is made of a material having a higher impact resistance than that of said series segments.

9. A rotary lawn mower cutter blade according to claim 1 wherein said cutter segments are disposed at a more negative rake angle than $-5°$.

10. A rotary lawn mower cutter blade according to claim 1 wherein at least the lower portion of said cutter face is angled upwardly and rearwardly at an angle greater than 45°.

11. A rotary lawn mower cutter blade according to claim 1 wherein said cutting face has a first planar section adjacent to said cutting edge and a second planar section disposed at a reduced angle relative to the first planar face section angle.

12. A rotary lawn mower cutter blade according to claim 1 wherein the largest outside spatial dimension of each cutter segment is along its cutting edge.

13. A rotary lawn mower cutter blade according to claim 1 wherein the hardness of said cutter segments is at least 80 based on the Rockwell "A" scale.

14. A rotary lawn mower cutter blade according to claim 1 wherein the leading edges of the end portions of said cutter bar to which said cutter segments are bonded are angled rearwardly from the leading edges of an intermediate portion of said cutter bar.

15. A rotary lawn mower cutter blade comprising: an elongated steel cutter bar adapted to rotate about an axis located in its center extending perpendicularly through a flat midsection, a plurality of cutter segments fusibly bonded together end to end in series with a series being fusibly bonded along a leading edge of each end of said bar, said segments having a hardness greater than the hardness of said cutter bar, each of said series cutter segments having exposed top, bottom and face surfaces and a bonded surface area which extends around more than 50% of its periphery so as to provide a ratio of bonded surface area measured in square inches to weight measured in ounces of at least 2:1, said cutter segments each having a weight such that the weight ratio between cutter bar and a cutter segment is greater than 600:1, said cutter segments being disposed at a rake angle less positive than $-5°$, said cutter segments having a cutter face angled upwardly and rearwardly from a cutting edge at an angle greater than 45° with respect to a bottom surface thereof, and a cutter tip segment fusibly bonded to said cutter bar adjacent to the outermost cutter segment of each of said series of cutter segments.

16. A rotary lawn mower cutter blade according to claim 15 wherein said cutter bar is provided with a plurality of pockets each of which surrounds a peripheral portion of one of said series segments.

17. A rotary lawn mower cutter blade according to claim 15 wherein said cutting face has a first planar section adjacent to said cutting edge and a second planar section disposed at a reduced angle relative to the first planar face section angle.

18. A rotary lawn mower cutter blade according to claim 15 wherein the hardness of said cutter segments is at least 80 based on the Rockwell "A" scale.

19. A rotary lawn mower cutter blade according to claim 15 wherein said cutter tip segment is made of a material having a higher impact resistance than that of said series segments.

20. A rotary lawn mower cutter blade according to claim 15 wherein the leading edges of the end portions of said cutter bar to which said cutter segments are bonded are angled rearwardly from the leading edges of an intermediate portion of said cutter bar.

21. A rotary lawn mower cutter blade comprising: an elongated steel cutter bar adapted to rotate about an axis located in its center extending perpendicularly through a flat midsection, a plurality of cutter segments fusibly bonded to each other and to a leading edge of each end of said bar by a fusible material having a hardness less than that of said cutter segments, said segments each having a cutting edge and a hardness greater than the hardness of said cutter bar, said segments being arranged in series with the outer end of each segment abutting the adjacent inner end of a succeeding segment in the series at the cutting edge, each of said segments having a cutting face angled upwardly and rearwardly from its cutting edge to an exposed upper surface, said cutting edge being disposed at a non positive rake angle and a cutter tip segment fusibly bonded to said cutter bar in abutment with the outermost cutter segment of each of said series of cutter segments.

22. A rotary lawn mower cutter blade according to claim 21 wherein the largest outside spatial dimension of each cutter segment is along its cutting edge.

23. A rotary lawn mower cutter blade according to claim 21 wherein each of said series cutter segments has an exposed lower surface and said cutting face is angled upwardly therefrom at an angle of at least 45°.

24. A rotary lawn mower cutter blade according to claim 21 wherein said cutter bar is provided with a plurality of pockets each of which surrounds a peripheral portion of one of said series segments.

* * * * *